(12) United States Patent
Nakamura et al.

(10) Patent No.: US 7,567,499 B2
(45) Date of Patent: Jul. 28, 2009

(54) OPTICAL DISC AND METHOD OF PRODUCING THE SAME

(75) Inventors: Itsuro Nakamura, Kanagawa-Ken (JP); Takayuki Onizawa, Kanagawa-Ken (JP); Naoyuki Nakagawa, Kanagawa-Ken (JP); Kenji Oishi, Kanagawa-Ken (JP); Takashi Ohgo, Kanagawa-Ken (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 553 days.

(21) Appl. No.: 11/512,507

(22) Filed: Aug. 30, 2006

(65) Prior Publication Data

US 2007/0048489 A1 Mar. 1, 2007

(30) Foreign Application Priority Data

Aug. 30, 2005 (JP) ............................. 2005-249734
Mar. 24, 2006 (JP) ............................. 2006-082381

(51) Int. Cl.
*G11B 7/00* (2006.01)
(52) U.S. Cl. ..................................... 369/275.1; 369/283
(58) Field of Classification Search ....................... None
See application file for complete search history.

(56) References Cited

U.S. PATENT DOCUMENTS

2003/0214902 A1* 11/2003 Yamada et al. ............ 369/275.5
2004/0076908 A1* 4/2004 Oomachi et al. .......... 430/270.13
2005/0068883 A1* 3/2005 Kondo et al. ................. 369/288

FOREIGN PATENT DOCUMENTS

JP 11-016214 1/1999
JP 11-120617 4/1999
JP 2002-100072 4/2002
WO WO 00/65584 11/2000

OTHER PUBLICATIONS

Japanese Office Action (w/English Translation) (Feb. 27, 2009—3 pages).

* cited by examiner

*Primary Examiner*—Muhammad N. Edun
(74) *Attorney, Agent, or Firm*—Renner, Kenner, Greive, Bobak, Taylor & Weber

(57) ABSTRACT

An optical disc includes a first substrate having a first surface having a first recording layer formed thereon, a first reflective film formed on the first recording layer, a second substrate having a second surface and a third surface on both sides with a second recording layer and a third recording layer formed thereon, respectively, a second semi-transparent reflective film formed on the second recording layer, a third semi-transparent reflective film formed on the third recording layer, an adhesive layer provided between the first and second reflective films, and a transparent cover layer having a fourth surface and a fifth surface on both sides, formed on the third semi-transparent reflective film at the fourth surface. The first recording layer is capable of storing first data in compliance with first specifications. The second recording layer is capable of storing second data in compliance with the first specifications. The third recording layer is capable of storing third data in compliance with second specifications different from the first specifications. The second semi-transparent reflective film has a thickness in the range from 5 nm to 15 nm. The transparent cover layer has a thickness of 100 μm±3 μm. The cover layer allows a laser beam to pass therethrough via the fifth surface in reproduction of the first, the second or the third data from the first, the second, or the third recording layer, respectively.

6 Claims, 7 Drawing Sheets

FIG. 2J

| REFLECTIVE-FILM(13a) THICKNESS(nm) | REFLECTIVITY [%] | | BD JITTER [%] | RESULTS |
|---|---|---|---|---|
| | DVD-L0 | DVD-L1 | | |
| 4 | 16.3 | 32.9 | 5.5 | NG |
| 5 | 18.1 | 30.3 | 5.5 | GOOD |
| 9 | 22.9 | 23.5 | 5.6 | GOOD |
| 11 | 24.7 | 21.2 | 5.4 | GOOD |
| 15 | 29.5 | 18.2 | 5.5 | GOOD |
| 16 | 32.4 | 15.9 | 5.4 | NG |
| 17 | 34.2 | 14.1 | 5.5 | NG |

FIG. 3

| N(atomic%) in SiC-N | REFLECTIVITY [%] | | | BD JITTER [%] | RESULTS |
|---|---|---|---|---|---|
| | BD | DVD-L0 | DVD-L1 | | |
| 0.5 | 15.4 | 17.3 | 17.1 | 5.5 | NG |
| 1 | 14.9 | 18.6 | 18.5 | 5.7 | GOOD |
| 3 | 14.2 | 19.7 | 19.8 | 5.7 | GOOD |
| 5 | 13.5 | 20.4 | 20.6 | 5.8 | GOOD |
| 7 | 12.8 | 21.3 | 21.4 | 5.9 | GOOD |
| 10 | 12.2 | 22.1 | 22.5 | 6.2 | GOOD |
| 11 | 11.6 | 23.4 | 23.8 | 6.9 | NG |
| 13 | 10.8 | 24.6 | 24.9 | 7.2 | NG |

FIG. 4

| REFLECTIVE-FILM(14a) THICKNESS(nm) | REFLECTIVITY [%] | | | BD JITTER [%] | RESULTS |
|---|---|---|---|---|---|
| | BD | DVD-L0 | DVD-L1 | | |
| 10 | 10.9 | 21.9 | 22.4 | 6.9 | NG |
| 12 | 11.4 | 21.1 | 21.7 | 6.6 | NG |
| 13 | 12.5 | 20.6 | 20.9 | 6.1 | GOOD |
| 15 | 13.6 | 20.0 | 20.4 | 5.8 | GOOD |
| 17 | 14.8 | 18.7 | 18.9 | 5.5 | GOOD |
| 19 | 15.9 | 18.3 | 18.7 | 5.3 | GOOD |
| 21 | 17.1 | 18.0 | 18.4 | 5.2 | GOOD |
| 22 | 18.3 | 17.6 | 17.8 | 5.1 | NG |

FIG. 5

| O(atomic%) in SiC-O | REFLECTIVITY [%] | | | BD JITTER [%] | RESULTS |
|---|---|---|---|---|---|
| | BD | DVD-L0 | DVD-L1 | | |
| 0.5 | 16.2 | 17.3 | 17.1 | 5.6 | NG |
| 1 | 15.3 | 18.5 | 18.2 | 5.7 | GOOD |
| 3 | 14.8 | 19.3 | 19.5 | 5.8 | GOOD |
| 5 | 13.9 | 20.4 | 20.2 | 5.8 | GOOD |
| 7 | 13.1 | 21.6 | 21.4 | 5.9 | GOOD |
| 10 | 12.7 | 22.9 | 23.1 | 6.1 | GOOD |
| 11 | 11.5 | 24.1 | 23.7 | 6.7 | NG |
| 13 | 9.9 | 25.2 | 24.8 | 7.4 | NG |

FIG. 6

| REFLECTIVE-FILM(14a) THICKNESS[nm] | REFLECTIVITY [%] | | | BD JITTER [%] | RESULTS |
|---|---|---|---|---|---|
| | BD | DVD-L0 | DVD-L1 | | |
| 10 | 10.5 | 22.4 | 21.9 | 7.2 | NG |
| 12 | 11.4 | 21.7 | 21.1 | 6.7 | NG |
| 13 | 12.6 | 20.9 | 20.6 | 6.3 | GOOD |
| 15 | 13.5 | 20.4 | 20.0 | 6.1 | GOOD |
| 17 | 15.1 | 18.9 | 18.7 | 5.8 | GOOD |
| 19 | 15.8 | 18.7 | 18.3 | 5.7 | GOOD |
| 21 | 16.9 | 18.3 | 18.0 | 5.5 | GOOD |
| 22 | 18.1 | 17.3 | 16.9 | 5.3 | NG |

FIG. 7

| H(atomic%) in SiC-H | REFLECTIVITY [%] | | | BD JITTER [%] | RESULTS |
|---|---|---|---|---|---|
| | BD | DVD-L0 | DVD-L1 | | |
| 0.5 | 18.3 | 15.7 | 15.4 | 5.4 | NG |
| 1 | 18.6 | 19.3 | 18.9 | 5.6 | GOOD |
| 3 | 19.5 | 20.5 | 19.9 | 5.7 | GOOD |
| 5 | 19.1 | 21.7 | 21.4 | 5.7 | GOOD |
| 7 | 18.4 | 22.9 | 22.7 | 5.8 | GOOD |
| 10 | 14.7 | 23.7 | 23.5 | 6.2 | GOOD |
| 11 | 11.2 | 24.8 | 24.1 | 7.1 | NG |
| 13 | 8.7 | 26.1 | 25.8 | 7.8 | NG |

FIG. 8

| REFLECTIVE-FILM(14a) THICKNESS[nm] | REFLECTIVITY [%] | | | BD JITTER [%] | RESULTS |
|---|---|---|---|---|---|
| | BD | DVD-L0 | DVD-L1 | | |
| 10 | 10.9 | 23.4 | 23.1 | 7.8 | NG |
| 12 | 11.4 | 22.7 | 22.3 | 6.9 | NG |
| 13 | 13.1 | 21.8 | 21.4 | 6.3 | GOOD |
| 15 | 13.8 | 21.2 | 21.1 | 5.8 | GOOD |
| 17 | 14.5 | 20.8 | 19.6 | 5.5 | GOOD |
| 19 | 15.9 | 19.3 | 18.6 | 5.2 | GOOD |
| 21 | 17.3 | 18.6 | 18.1 | 5.2 | GOOD |
| 22 | 18.5 | 17.5 | 16.9 | 5.1 | NG |

FIG. 9

| REFLECTIVE FILM(14a) | | SIGNAL MAGNITUDE REFLECTIVE FILM(14a) VS.COVER LAYER(17) | BD REFLECTIVITY | DUAL DVD REFLECTIVITY |
|---|---|---|---|---|
| MATERIAL | THICKNESS [nm] | | | |
| Si | 24 | S17<S14a | GOOD | NG |
| | 12 | S17>S14a | NG | GOOD |
| SiH | 13 | S17>S14a | GOOD | GOOD |
| SiC-H | 15 | S17>S14a | GOOD | GOOD |
| Ag | 20 | S17<S14a | GOOD | NG |
| Al | 30 | S17<S14a | GOOD | NG |

| REFLECTIVE FILM(14a) | | THICKNESS [nm] | REFLECTIVITY TO 2ND LASER(L2) | SIGNAL MAGNITUDE REFLECTIVE FILM(14a) VS.COVER LAYER(17) | BD REFLECTIVITY | REPRODUCTION FROM DVD RECORDING LAYER |
|---|---|---|---|---|---|---|
| MATERIAL | H CONTENT (atomic%) | | | | | |
| Si | — | 16 | 12 | S17<S14a | NG | UNSTABLE |
| Si | — | 12 | 10 | S17>S14a | GOOD | STABLE |
| SiH | 2 | 13 | 12 | S17>S14a | GOOD | STABLE |
| SiH | 2 | 17 | 19 | S17>S14a | GOOD | STABLE |
| SiH | 6 | 18 | 20 | S17<S14a | GOOD | LESS STABLE |
| SiH | 8 | 20 | 23 | S17<S14a | GOOD | LESS STABLE |
| SiC-H | 2 | 14 | 12 | S17>S14a | GOOD | STABLE |
| SiC-H | 2 | 18 | 19 | S17>S14a | GOOD | STABLE |
| SiC-H | 6 | 19 | 20 | S17<S14a | GOOD | LESS STABLE |
| SiC-H | 8 | 21 | 23 | S17<S14a | GOOD | LESS STABLE |

FIG. 12

OPTICAL DISC AND METHOD OF PRODUCING THE SAME

CROSS-REFERENCE TO RELATED APPLICATIONS

This application is based on and claims the benefit of priority from the prior Japanese Patent Application No. 2005-249734 filed on Aug. 30, 2005 and No. 2006-082381 filed on Mar. 24, 2006, the entire contents of which are incorporated herein by reference.

BACKGROUND OF THE INVENTION

The present invention relates to an optical disc having two or more of recording layers including a recording layer from which data is read by, for example, a blue laser and another recording layer from which data is read by, for example, a red laser and a method of producing such an optical disc.

Optical discs have a large storage capacity and are for use in non-contact reproduction, and hence widely used as read-only type discs, such as, CD and DVD (Digital Versatile Disc)-Video, write-once type discs, such as, CD-R and DVD-R, and also rewritable type discs, such as, CD-RW, DVD-RAM and DVD-RW.

One type of an optical disc in widespread use at present is DVD in compliance with the DVD-Read Only Memory specifications (referred to as the DVD-ROM specifications, hereinafter). Another type of an optical disc which will probably be popular in the near future is a next-generation high-density optical disc that is a Blu-ray disc (BD) in compliance with the Blu-ray Disc Read-Only Format specifications (referred to as the BD-ROM specifications, hereinafter). It is expected that DVD and BD will coexist for a certain period of time.

Under such expectations, disc manufacturers have to produce both DVD and BD for the same video contents, such as movies, which is inefficient in cost performance. Moreover, users may have a trouble with choice, for example, whether to buy a DVD for a movie or a BD player and wait for a BD for that movie.

Such a problem could be solved if there is an optical disc having a DVD-recording layer and a BD-recording layer in compliance with the DVD and BD specifications, respectively.

Most DVDs now available on the market is a dual-layer type with two recording layers for higher storage capacity. It is preferred for such a dual-layer disc to have two DVD-recording layers as well as a BD-recording layer.

Such an optical disc may have a BD-layer structure with a BD-recording layer and a DVD-layer structure with two DVD-recording layers laminated in order on a transparent layer (via which a laser beam is incident). Data stored in each recording layer is read by a laser beam incident from the BD-layer structure side via the transparent layer.

Such an optical disc, however, have to be produced to meet both DVD- and BD-ROM specifications for reproduction of DVD-quality videos by a DVD player and also BD-quality (hi-vision level) videos by a BD player.

In reproduction from the DVD-recording layers of the DVD-layer structure, a laser beam is incident to the DVD-recording layers after passing through the BD-layer structure. Thus, a BD-reflective film that is formed between the transparent layer and the BD-recording layer and constitutes the BD-layer structure with the BD-recording layer is required to meet both of the DVD and BD specifications on reflectivity, which is, however, very difficult.

A higher reflectivity for the BD-reflective film of the BD-layer structure causes decrease in reflectivity on the DVD-recording layers, which lowers video quality in reproduction from the DVD-recording layers. In contrast, a lower reflectivity for the BD-reflective film for higher reproduction performance from the DVD-recording layers causes difficulty in reproduction from the BD-recording layer.

WO00/65584 teaches the thickness range from 8 nm to 20 nm for such a reflective film in a BD-layer structure. This is an appropriate thickness range for the reflective film in a BD-layer structure of an optical disc having a single recording layer with no DVD-layer structure. Thus, there is no discussion on reflectivity for DVD-recording layers.

As discussed above, there is one requirement for an optical disc having at least two DVD-recording layers and one BD-recording layer. It is about the reflective film formed between the BD-recording layer and the transparent layer via which a laser beam is incident in reproduction. In detail, this particular reflective film must meet both of the DVD and BD specifications for its reflectivity.

SUMMARY OF THE INVENTION

A purpose of the present invention is to provide an optical disc having at least one recording layer that exhibits reflectivity within the DVD specifications and at least one another recording layer that exhibits reflectivity within the BD specifications, available for reproduction at image quality in each of the specifications, and a method of producing such an optical disc.

The present invention provides an optical disc comprising: a first substrate having a first surface, the first surface having a first recording layer formed thereon, the first recording layer being capable of storing first data in compliance with first specifications; a first reflective film formed on the first recording layer; a second substrate having a second surface and a third surface on both sides, the second surface having a second recording layer formed thereon, the second recording layer being capable of storing second data in compliance with the first specifications, the third surface having a third recording layer formed thereon, the third recording layer being capable of storing third data in compliance with second specifications different from the first specifications; a second semi-transparent reflective film formed on the second recording layer, the second semi-transparent reflective film having a thickness in the range from 5 nm to 15 nm; a third semi-transparent reflective film formed on the third recording layer; an adhesive layer provided between the first and second reflective films; and a transparent cover layer, having a thickness of 100 µm±3 µm, with a fourth surface and a fifth surface on both sides, the transparent layer being formed on the third semi-transparent reflective film at the fourth surface, the fifth surface allowing a laser beam to pass therethrough in reproduction of the first, the second or the third data from the first, the second, or the third recording layer, respectively.

Moreover, the present invention provides a method of producing an optical disc comprising the steps of: forming a first recording layer on a first surface of a first substrate, the first recording layer being capable of storing first data in compliance with first specifications; forming a first reflective film formed on the first recording layer; forming a second recording layer and a third recording layer on a second surface and a third surface, respectively, of a second substrate on both sides, the second recording layer being capable of storing second data in compliance with the first specifications, the third recording layer being capable of storing third data in compliance with second specifications different from the first specifications; forming a second semi-transparent reflective film on the second recording layer, the second semi-transparent reflective film having a thickness in the range from 5 nm to 15 nm; forming a third semi-transparent reflective film on the third recording layer; bonding the first and second reflective films via an adhesive layer provided therebetween; and forming a transparent cover laye, having a thickness of 100 μm±3 μm on the third semi-transparent reflective film.

BRIEF DESCRIPTION OF DRAWINGS

FIG. 3 is a view showing a table for use in evaluation of the disc characteristics depending on the thickness of the second semi-transparent reflective film 13a in the optical disc according to the present invention;

FIG. 4 is a view showing a table for use in evaluation of the disc characteristics depending on the content of N in SiC—N, a material for the third semi-transparent reflective film 14a in the optical disc according to the present invention;

FIG. 5 is a view showing a table for use in evaluation of the disc characteristics depending on the thickness of the third semi-transparent reflective film 14a in the optical disc according to the present invention;

FIG. 6 is a view showing a table for use in evaluation of the disc characteristics depending on the content of O in SiC—O, a material for the third semi-transparent reflective film 14a in the optical disc according to the present invention;

FIG. 7 is a view showing a table for use in evaluation of the disc characteristics depending on the thickness of the third semi-transparent reflective film 14a in the optical disc according to the present invention;

FIG. 8 is a view showing a table for use in evaluation of the disc characteristics depending on the content of H in SiC—H, a material for the third semi-transparent reflective film 14a in the optical disc according to the present invention;

FIG. 9 is a view showing a table for use in evaluation of the disc characteristics depending on the thickness of the third semi-transparent reflective film 14a in the optical disc according to the present invention;

FIG. 12 is a view showing a table for use in evaluation of the disc characteristics depending on the material, the content of the secondary component in the material and the thickness of the third semi-transparent reflective film 14a in the optical disc according to the present invention.

DETAILED DESCRIPTION OF PREFERRED EMBODIMENTS

Preferred embodiments of an optical disc and a production method for such an optical disc according to the present invention will be disclosed with reference to the attached drawings.

The same reference signs or numerals are given to the same or analogous elements throughout the figures. The figures are not drawn in scale and exaggerated particularly in the thickness direction for easier understanding.

Figure 1:
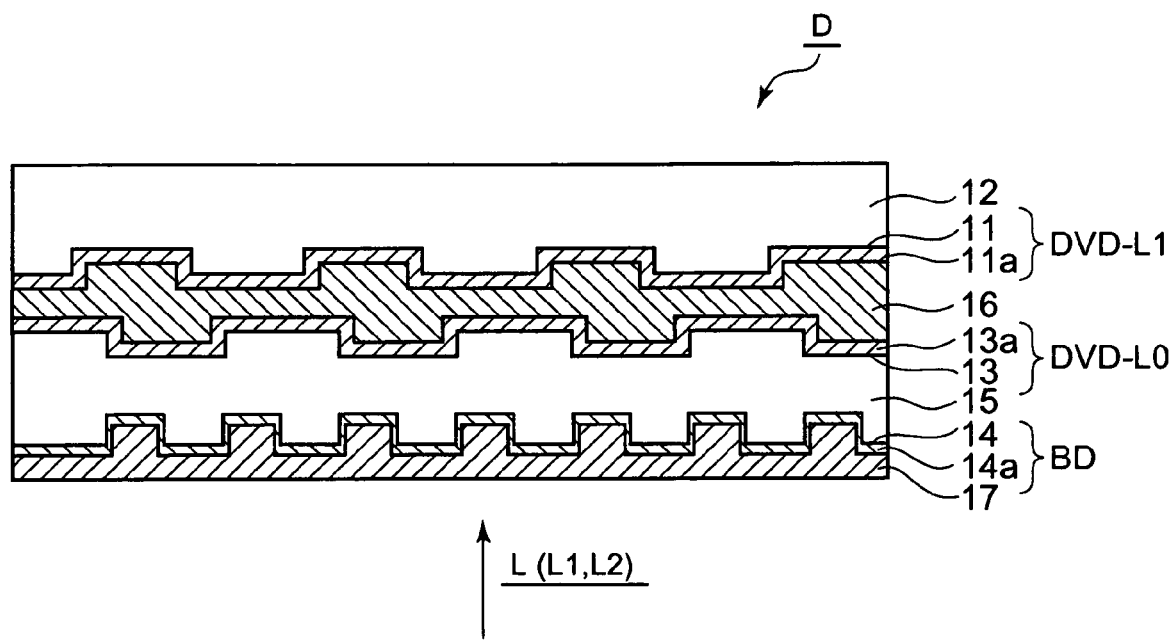
FIG. 1 is a sectional view showing a laminated structure of an optical disc D as a preferred embodiment according to the present invention.

FIG. 1 shows a laminated structure of an optical disc D as a preferred embodiment according to the present invention.

As shown in FIG. 1, the optical disc D has a first substrate 12 and a second substrate 15. Formed in order on one surface of the first substrate 12 are a first recording layer 11 and a first reflective film 11a. The other surface of the first substrate 12 is for use in title labeling. Formed in order on one surface of the second substrate 15 are a second recording layer 13 and a second semi-transparent reflective film 13a. Formed in order on the other surface of the second substrate 15 are a third recording layer 14, a third semi-transparent reflective film 14a, and a transparent cover layer 17. The first and second substrates 12 and 15 are bonded to each other via an adhesive layer 16 so that the first and second reflective films 11a and 13a face each other.

In other words, formed in order on one surface of the first substrate 12 are the first recording layer 11, the first reflective film 11a, the adhesive layer 16, the second semi-transparent reflective film 13a, the second recording layer 13, the second substrate 15, the third recording layer 14, the third semi-transparent reflective film 14a, and the transparent cover layer 17.

Incident via the transparent cover layer 17 is a first laser beam L1 for reproduction from the first or the second recording layer 11 or 13, and also a second laser beam L2 for reproduction from the third recording layers 14. A wavelength of the first laser beam L1 is in the range from 630 nm to 650 nm. A wavelength of the second laser beam L2 is in the range from 360 nm to 440 nm. The first and second laser beams L1 and L2 are referred to as a laser beam L hereinafter when both are concerned.

The first substrate 12 has a thickness of 0.6 mm±30 μm. A string of first data pits (a data pit pattern) is formed on the surface (the first recording layer 11) of the substrate 12, based on data to be recorded. The first data pits are formed in compliance with the first specifications (DVD-ROM specifications).

The second substrate 15 has a thickness of 0.5 mm±30 μm. A string of second data pits is formed on one (the second recording layer 13) of the surfaces of the substrate 15, based on data to be recorded. The second data pits are also formed in compliance with the first specifications (DVD-ROM specifications). Formed on the other surface (the third recording layer 14) of the second substrate 15 is a string of third data pits in compliance with the second specifications (BD-ROM specifications).

The transparent cover layer 17 has a thickness of 0.1 mm±3 μm. The total thickness of the optical disc D shown in FIG. 1 is then about 1.2 mm which meets both of the DVD- and BD-ROM specifications. The other layers and films that constitute the optical disc D are very thin and thus can be disregarded in relation to the first and second substrates 12 and 15, and the transparent cover layer 17, when the total thickness is under consideration.

In operation, the laser beam L (L1, L2) is incident via the transparent cover layer 17, as shown in FIG. 1, in reproduction of data recorded in the first, the second or the third recording layer 11, 13 or 14.

In detail, the first laser beam L1 having a wavelength in the range from 630 nm to 650 nm hits the first recording layer 11 or the second recording layer 13 to pick up data from the first or the second data pits formed in compliance with the DVD-ROM specifications. In contrast, the second laser beam L2 having a wavelength in the range from 360 nm to 440 nm hits the third recording layer 14 to pick up data from the third data pits formed in compliance with the BD-ROM specifications.

The layer structure constituted by the first recording layer 11 and the first reflective film 11a is referred to as a DVD-L1 composite layer. The layer structure constituted by the second recording layer 13 and the second semi-transparent reflective film 13a is referred to as a DVD-L0 composite layer, in the following discussion. The layer structure constituted by the third recording layer 14 and the third semi-transparent reflective film 14a is referred to as a BD composite layer, in the following discussion.

Figure 2A:
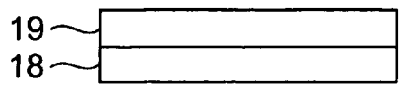
FIGS. 2A to 2P are sectional views illustrating a preferred embodiment of a method of producing the optical disc according to the present invention.
Figure 2B:
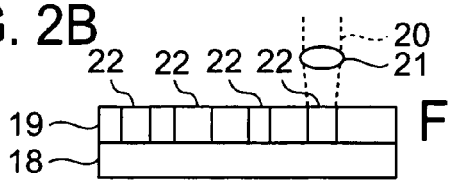
Figure 2C:
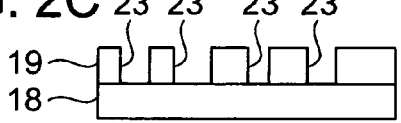
Figure 2D:
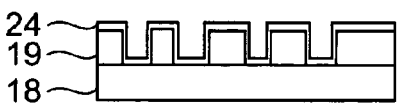
Figure 2E:
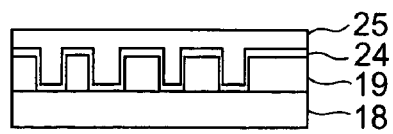
Figure 2F:
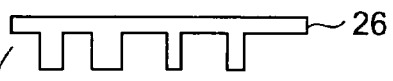
Figure 2G:
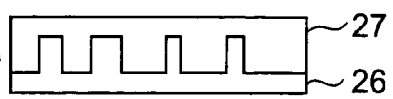
Figure 2H:
Figure 2I:
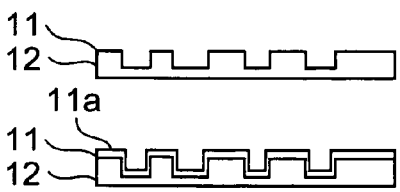
Figure 2K:
Figure 2L:
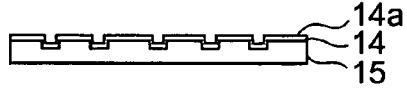
Figure 2M:
Figure 2N:
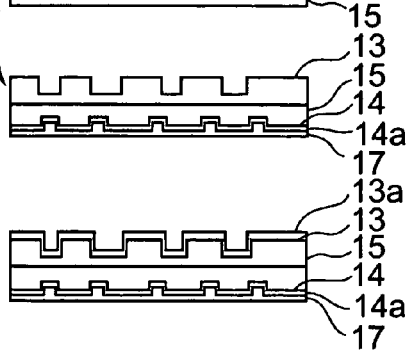
Figure 2O:
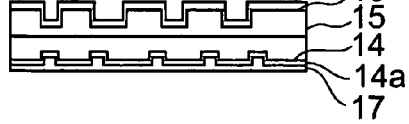
Figure 2P:
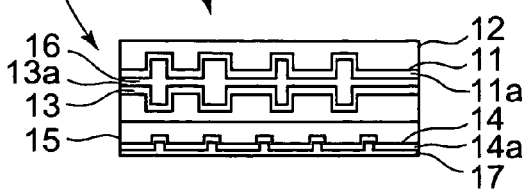

Disclosed next with reference to FIGS. 2A to 2P is a method of producing the optical disc D, the preferred embodiment of the present invention.

Disclosed first is a method of producing a DVD-stamper and a BD-stamper with reference to FIGS. 2A to 2H.

As shown in FIG. 2A, a photoresist layer 19 is formed by, for example, spin coating, on a glass plate 18 with the surface thereof being polished and cleaned, thus a blank master being produced.

Next, as shown in FIG. 2B, the glass plate 18 having the photoresist layer 19 thereon is exposed to a minute spot of a laser beam 20 converged by an objective lens 21.

The laser beam 20 is adjusted to have a specific wavelength so that pits are formed as having a size in compliance with the DVD- or BD-ROM specifications. For example, in production of a DVD-stamper, an ultraviolet laser is adjusted to have a wavelength in the range from 350 nm to 450 nm. Such an ultraviolet laser is an Ar laser, a Kr laser, an He—Cd laser, etc. Moreover, in production of a BD-stamper, a deep ultraviolet laser is adjusted to have a wavelength in the range from 200 nm to 300 nm.

The glass plate 18 is exposed to the laser beam 20 while it is rotating or moving at a constant speed. The laser beam 20 is turned on and off or continuously emitted to the plate 18.

Formed on the photoresist layer 19 in this process is a concentric or spiral latent image 22 that indicates each pit carrying a modulated signal in compliance with the DVD- or BD-ROM specifications.

Next, as shown in FIG. 2C, a glass plate having a string of pits 23 is produced in a developing process with an alkaline solution.

A conductive film 24, made from nickel, for example, is formed on the glass plate, as shown in FIG. 2D, by sputtering or electroless plating.

The glass plate is soaked into a nickel sulfamate, with the conductive film 24 and nickel as a cathode and an anode, respectively. A specific voltage is applied across the cathode and anode, thus nickel 25 being deposited on the glass plate, as shown in FIG. 2E.

The nickel 25 is removed from the glass plate, thus a metal master plate, or a stamper 26 is produced, as shown in FIG. 2F, which has a concave and convex pattern based on a data signal to be recorded.

The foregoing disclosed with reference to FIGS. 2A to 2F is a stamper production process.

The stamper 26 produced as above is used for mass production of optical discs in the following disc production process. In detail, the stamper 26 is subjected to post-treatments, such as, inner and outer diameter processing and rear-face polishing. It is then attached to a die and set in a molding machine.

As shown in FIG. 2G, a mold substrate 27 is produced with a synthetic resin that exhibits transparency, such as, acrylic and polycarbonate resin, using the stamper 26 as a die. This production process employs a compression molding, an injection molding or a photopolymer (2P) method. The thickness of the mold substrate 27 is adjusted in accordance with the type of optical discs.

The mold substrate 27 is then removed from the stamper 26, as shown in FIG. 2H.

In the 2P method, the mold substrate 27 is made from a photopolymerized polymer, such as, a UV (ultraviolet)-cured resin. The stamper 26 used in the 2P method may be a metal stamper of, for example, nickel, or a soft stamper (resin stamper) made from, for example, a transparent resin, like used for the mold substrate 27. When the metal stamper is used, the mold substrate 27 is exposed to UV rays so that the resin is cured. Thus, UV rays must be radiated to the substrate side with the resin applied thereon. In contrast, when the soft stamper is used, UV rays can pass through either side of the stamper and the resin of the substrate 27. Therefore, UV rays can be radiated to either the stamper side or the substrate side.

Such a soft stamper is preferably made from a resin similar to the mold substrate 27. Nevertheless, in this case, the mold substrate 27 and the soft stamper exhibit close adhesiveness. Thus, data pits, formed on the mold substrate 27 based on the concave and convex sections of the soft stamper, could be damaged when the substrate 27 is removed from the soft stamper, as shown in FIGS. 2G and 2H.

It is therefore preferable to choose a highly releasable resin for the soft stamper or form a thin film of a highly releasable material on the stamper. A polyolefin resin exhibits high releasability. Moreover, such a thin film of high releasability may be formed with a polyolefin resin dissolved in an organic solvent with spin coating. Or, such a thin film of 1 nm to 100 nm in thickness may be formed with a metal, such as Si or Au, with a vacuum film forming technique, such as, sputtering.

The 2P method is explained briefly. A liquid UV-cured resin is applied onto the stamper 26 having the concave and convex sections formed thereon in compliance with the DVD- or BD-ROM specifications while the stamper 26 is rotating. A resin substrate having a flat surface is then attached on the stamper 26. A mechanical stress is applied to them to form a uniform adhesive layer therebetween, followed by exposure to UV rays to cure the UV-cured resin. The stamper 26 is then removed from the resin substrate. Formed on the resin substrate are a string of data pits that correspond to the concave and convex sections of the stamper 26. The resin substrate having the data pits is used as the mold substrate 27.

Another technique in the 2P method is application of a liquid UV-cured resin onto both of the stamper 26 and the resin substrate, followed by bonding with a mechanical stress, curing the UV-cured resin, and then removal of the stamper 26.

Still, another technique in the 2P method is application of a liquid UV-cured resin onto the resin substrate, followed by bonding with the stamper 26 with a mechanical stress, curing the UV-cured resin, and removal of the stamper 26, thus data pits being formed on the resin substrate.

Disclosed next with reference to FIGS. 2I and 2J is production of the first substrate 12 of the optical disc D, the preferred embodiment of the present invention.

The stamper 26 produced as disclosed above is used in injection molding with a resin, such as, polycarbonate, as a material of optical discs. The stamper 26 has a concave and convex pattern in compliance with the DVD-ROM specifications.

Formed in this process is the first substrate 12 having the first recording layer 11 with a string of the first data pits in compliance with the DVD-ROM specifications, as shown in FIG. 2I. The first data pits carry data recorded in compliance with the DVD-ROM specifications. The thickness of the substrate 12 in this embodiment is 0.6 mm (±30 µm) according to the DVD-ROM specifications.

Next, as shown in FIG. 2J, the first reflective film 11a is formed on the first recording layer 11, which is required in signal reproduction. The reflective film 11a is formed by a vacuum film forming technique, such as, sputtering or vacuum deposition, with a metal, such as Al, Ag or Au, or an alloy with one of these metals as a primary component. The primary component is defined as a component most involved in a material of a layer or film, in this embodiment.

As shown in FIG. 1, the first recording layer 11 is provided as the furthest recording layer among the three recording layers 11, 13 and 14 when viewed from the transparent cover layer 17 via which the laser beam L is incident in reproduction. The arrangements allow the first reflective film 11a to have a thickness such as, in the range from 50 nm to 100 nm, for the maximum reflectivity, or the minimum transparency to the laser beam L.

Disclosed next with reference to FIGS. 2K and 2O is production of the second substrate 15 of the optical disc D, the preferred embodiment of the present invention.

There are two methods of producing the second substrate 15 that requires a string of data pits on both sides.

A first method of producing the second substrate 15 is as follows: Prepared first is a stamper having a concave and convex pattern in compliance with the DVD-ROM specifications. Prepared next is another stamper having a concave and convex pattern in compliance with the BD-ROM specifications. These stampers can be produced as disclosed with reference to FIGS. 2A to 2F. The two stampers are used in injection molding, thus a resin substrate (the second substrate 15) being produced as having a string of data pits on both sides.

A second method of producing the second substrate 15 is a combination of an injection molding and a photopolymer (2P) method. At first, the injection molding method is performed with a metal stamper to form one surface of the substrate 15 as having a string of data pits. This is followed by the photopolymer method with a UV-cured resin to form a string of data pits on the other surface of the substrate 15.

The second substrate 15 produced by either the first or the second method has a thickness of 0.5 mm (±30 µm) in this embodiment. This thickness allows, in FIG. 1, the optical length from the transparent cover layer 17, via which the laser beam L is incident, to each of the recording layers 11, 13 and 14 to meet the DVD- or BD-ROM specifications.

In production of a string of data by the 2P method, a UV-cured resin layer having the string of data formed thereon has a thickness in the range from 10 pm to 25 µm. Thus, the resin substrate is adjusted to have a certain thickness which gives 0.5 mm (±30 µm) to the total thickness of the resin substrate and the UV-cured resin layer.

The embodiment employs the second method (the combination of the injection molding and 2P method) to produce the second substrate 15, as disclosed below.

The stamper 26 produced as disclosed with reference to FIGS. 2A to 2F is used in injection molding with a resin, such as, polycarbonate, as a material of optical discs. The stamper 26 in this process has a concave and convex pattern in compliance with the BD-ROM specifications.

Formed in this process is the second substrate 15 having the third recording layer 14 having a string of the third data pits in compliance with the BD-ROM specifications, as shown in FIG. 2K. The third data pits carry data recorded in compliance with the BD-ROM specifications.

Next, as shown in FIG. 2L, the third semi-transparent reflective film 14a is formed on the third recording layer 14. The reflective film 14a allows laser and UV beams to pass therethrough. A suitable material for the reflective film 14a is a mixture of SiC (silicon carbide), a primary component, and any one of the elements N (nitrogen), O (oxygen) and H (hydrogen).

In forming the third semi-transparent reflective film 14a with SiC and N, a small amount of an $N_2$ gas is introduced into a vacuum chamber in addition to an Ar gas, when SiC is sputtered on the third recording layer 14. A preferable thickness range for the reflective film 14a is from about 13 nm to 21 nm. An $O_2$ or $H_2$ gas is introduced for a mixture of SiC (primary component) and O or H.

An alternative to such a mixture for the third semi-transparent reflective film 14a is SiC as a primary component and a compound of at least two elements from N, O and H as a secondary component, or Si as a primary component and a compound of at least one element from N, O and H as a secondary component.

The term "primary component" means a component involved in a mixture and the amount of which is the largest among several components involved in the mixture.

Next, as shown in FIG. 2M, the third reflective film 14a is covered with the transparent cover layer 17 in compliance with the BD-ROM specifications. The cover layer 17 has a thickness of 100 µm±3 µm in this embodiment. It is made of a film-type polycarbonate substrate with a UV-cured resin adhesive or a sheet-type adhesive, or of UV-cured resin only.

Accordingly, the second substrate 15 has the stack of the third recording layer 14, the semi-transparent reflective film 14a, and the transparent cover layer 17, all in compliance with the BD-ROM specifications, on one of its surfaces.

A UV-cured resin is then applied onto the other surface of the second substrate 15. The 2P method with a soft stamper is performed to this surface of the substrate 15, with UV rays on the stamper side. Produced in this method is the second recording layer 13 having a string of the second data pits in compliance with the DVD-ROM specifications (dual-layer type), as shown in FIG. 2N.

Next, as shown in FIG. 2O, the second semi-transparent reflective film 13a is formed on the second recording layer 13, as having a very thin film, preferably, in the range from 5 nm to 15 nm. The reflective film 13a is made from a metal, such as Au, Ag or Al, or an alloy with one of these metals as a primary component. Another choice for the reflective film 13a is Si (amorphous silicon), SiC or SiH. Further choice is a dielectric that exhibits high refraction and transparency to the laser beam L in reproduction, such as ZnS, $TiO_2$, SiN and GeN.

Finally, as shown in FIG. 2P, the first substrate 12 and the second substrate 15 are bonded to each other via the adhesive layer 16. They are bonded so that the first reflective film 11a and the second semi-transparent reflective film 13a face each other. In detail, for example, a liquid acryrate UV-cured resin is applied onto the first reflective film 11a of the first substrate 12. Then, the second substrate is placed on the first substrate 12 so that the first and second reflective films 11a and 13a face each other. The liquid acryrate UV-cured resin is adjusted to a specific thickness by spin coating. It is then cured by exposure to UV rays. The rays are radiated via the transparent cover layer 17 of the second substrate 15. This is because the rays cannot reach the UV-cured resin from the first substrate 12 side in this embodiment. The liquid acryrate UV-cured resin may be applied onto the second reflective film 13a of the second substrate 15.

Another bonding method employs a sheet-type adhesive. The adhesive is provided between the two substrates, followed by application of a mechanical stress to the substrates.

The adhesive layer 16 functions as a gap layer between the recording layers according to the dual-layer DVD-ROM specifications. Thus, in either bonding method, the thickness of the adhesive layer 16 is adjusted to in the range from 35 µm to 65 µm.

This embodiment employs injection molding in production of the recoding layer 14 in compliance with the BD-ROM specifications and the 2P method in production of the recoding layer 13 in compliance with the DVD-ROM specifications, on both sides of the substrate 15.

However, the present invention is not limited to such methods. For, example, the 2P method with a soft stamper can be employed in production of the recoding layer 14 in compliance with the BD-ROM specifications. And, injection molding can be employed in production of the recoding layer 13 in compliance with the DVD-ROM specifications. Moreover, injection molding can be employed in production of both of the recoding layers 13 and 14, on both sides of the substrate 15, at the lowest cost among the methods described above.

Whichever method is employed in production of the recording layers 13 and 14 on the second substrate 15, the subsequent formation of the reflective films, bonding with the first substrate 12, and formation of the transparent cover layer 17 may not be limited to the order disclosed above, or may be implemented in any order.

The third semi-transparent reflective film 14a of the optical disc D in this embodiment reflects the second laser beam L2 but allows the first laser beam L1 to pass therethrough.

The second laser beam L2 has a wavelength in compliance with the BD-ROM specifications whereas the first laser beam L1 has a wavelength in compliance with the DVD-ROM specifications, as discussed above.

Therefore, the third semi-transparent reflective film 14a in this embodiment has to satisfy both of the DVD- and BD-ROM specifications in reflectivity.

The reflectivity ranges defined in the DVD- and BD-ROM specifications are: 18% to 30% for dual-layer DVD having two recording layers; 12% to 28% in low reflectivity whereas 35% to 70% in high reflectivity for single-layer BD having one recording layer.

The optical disc D in this embodiment has two recording layers and one recording layer in compliance with the DVD- and BD-ROM specifications, respectively. Therefore, the optical disc D has to satisfy the specifications in reflectivity range at least for the single-layer BD and also the dual-layer DVD, discussed above.

Moreover, the second semi-transparent reflective film 13a of the optical disc D in this embodiment reflects the first laser beam L1 having a wavelength in compliance with the DVD-ROM specifications. This occurs when the laser beam L1 is incident via the third semi-transparent reflective film 14a, in reproduction from the second recording layer 13. However, the reflective film 13a functions differently when the laser beam L1 is incident via the third semi-transparent reflective film 14a, in reproduction from the first recording layer 11. In detail, it allows this laser beam L1 and a reflected beam from the recording layer 11 to pass therethrough.

Therefore, the second semi-transparent reflective film 13a of the optical disc D in this embodiment has to be adjusted to exhibit a particular reflectivity required for reproducing data (signal) recorded in the second recording layer 13, but a particular transparency to allow a laser beam to pass therethrough in reproducing data (signal) recorded in the first recording layer 11.

The first reflective film 11a of the optical disc D in this embodiment reflects the first laser beam L1 in a specific reflectivity range when the beam L1 is incident via the second and third semi-transparent reflective films 13a and 14a.

It is thus expected that the thickness of the third semi-transparent reflective film 14a of the BD composite layer (defined as above with reference to FIG. 1) affects reproduction from the first, the second and the third recording layer 11, 13 and 14 (DVD- or BD-recording layers) in compliance with the DVD- or BD-ROM specifications.

The following is the discussion on an optimum thickness for the second and third semi-transparent reflective films 13a and 14a, and an optimum composition for the material of the film 14a, that offers high reproduction performance from those DVD- and BD-recording layers, with reference to FIGS. 3 to 9.

Several sample optical discs were produced according to the embodiment of the present invention, with variation in thickness of the semi-transparent reflective film 13a or 14a, or the material of the reflective film 14a, and evaluated for reflectivity and jitters (disc characteristics), as shown in FIGS. 3 to 9.

Several items in tables of FIGS. 3 to 9 are defined as follows:

In reflectivity, the items BD, DVD-L0, and DVD-L1 indicate the third semi-transparent reflective film 14a, the second semi-transparent reflective film 13a, and the first reflective film 11a, respectively, in the BD, the DVD-L0, and the DVD-L1 composite layer (defined as above with reference to FIG. 1), respectively.

Moreover, several data in the items BD, DVD-L0, and DVD-L1 are reflectivities of: the third semi-transparent reflective film 14a when the second laser beam L2 is focused onto the third recording layer 14; the second semi-transparent reflective film 13a when the first laser beam L1 is focused onto the second recording layer 13; and the first reflective film 11a when the beam L1 is focused onto the first recording layer 11, respectively, in reproduction.

The laser beam L focused onto each recording layer is reflected not only from the reflective film adjacent to each recording layer but also from the other films that constitute the optical disc D. Reflection from each of the other films is, however, very small and thus negligible.

Therefore, in the following discussion, the reflectivity of a reflective film adjacent to a recording layer is treated as the reflectivity for the laser beam L focused onto this recording layer.

In RESULTS in tables of FIGS. 3 to 9, a grade GOOD is given to the sample discs that exhibited reflectivities within the low reflectivity specifications ranging from 12% to 28% for the single-layer BD and the reflectivity specifications ranging from 18% to 30% for the dual-layer DVD, and also jitters at or below 6.5% in the jitter specifications for the single-layer BD, whereas a grade NG (No Good) is given to the sample discs that exhibited reflectivities and jitters out of the specifications. Jitters were measured using a limit equalizer for the single-layer BD.

Evaluation is made for the several sample discs according to the tables in FIGS. 3 to 9.

The sample discs listed in the table in FIG. 3 were produced with SiC—N (a mixture of SiC and N at 2 atomic %) for the third semi-transparent reflective film 14a in the single-layer BD. The expression "N at 2 atomic %" in the above case means that 2 atomic % of N is involved in SiC—N, or the content of N in SiC—N is 2 atomic %. The same expression is applied to other elements each involved in a certain material of a reflective film, which will be discussed later. The reflective film 14a exhibited 14% in reflectivity in each sample disc.

FIG. 3 teaches that the sample discs having the second semi-transparent reflective film 13a with the thickness in the range from 5 nm to 15 nm satisfy the reflectivity specifications for the dual-layer DVD and also the jitter specifications for the single-layer BD. It is thus preferable for the optical disc D to have the second semi-transparent reflective film 13a with the thickness in the range from 5 nm to 15 nm in the DVD-L0 composite layer according to the present invention.

Discussed next with reference to FIG. 4 are the disc characteristics of several sample optical discs depending on the content of N in SiC—N, the material from which the third semi-transparent reflective film 14a was made. In the table of FIG. 4, the thicknesses of the second and third semi-transparent reflective films 13a and 14a were 9 nm and 15 nm, respectively, for all of the sample discs.

The table in FIG. 4 teaches that the sample discs having the third semi-transparent reflective film 14a made from SiC—N with the content of N in the range from 1 atomic % to 10 atomic % satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a made from SiC—N with the content of N in the range from 1 atomic % to 10 atomic % in the BD composite layer according to the present invention. More feasible range of N for the film 14a is 1 atomic % to 5 atomic % for higher disc characteristics.

Discussed next with reference to FIG. 5 are the disc characteristics of several sample optical discs depending on the thickness of the third semi-transparent reflective film 14a. In the table of FIG. 5, the third semi-transparent reflective film 14a was made from SiC—N (a mixture of SiC and N at 2 atomic %), with the second semi-transparent reflective film 13a of 9 nm in thickness, for all of the sample discs.

The table in FIG. 5 teaches that the sample discs having the third semi-transparent reflective film 14a with the thickness in the range from 13 nm to 21 nm satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a with the thickness in the range from 13 nm to 21 nm when made from SiC—N, in the BD composite layer according to the present invention.

Discussed next with reference to FIG. 6 are the disc characteristics of several sample optical discs depending on the content of O in SiC—O, the material from which the third semi-transparent reflective film 14a was made. In the table of FIG. 6, the thicknesses of the second and third semi-transparent reflective films 13a and 14a were 9 nm and 15 nm, respectively, for all of the sample discs.

The table in FIG. 6 teaches that the sample discs having the third semi-transparent reflective film 14a made from SiC—O with the content of O in the range from 1 atomic % to 10 atomic % satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a made from SiC—O with the content of O in the range from 1 atomic % to 10 atomic % in the BD composite layer according to the present invention. More feasible range of O for the film 14a is 1 atomic % to 5 atomic % for higher disc characteristics.

Discussed next with reference to FIG. 7 are the disc characteristics of several sample optical discs depending on the thickness of the third semi-transparent reflective film 14a. In the table of FIG. 7, the third semi-transparent reflective film 14a was made from SiC—O (a mixture of SiC and O at 2 atomic %), with the second semi-transparent reflective film 13a of 9 nm in thickness, for all of the sample discs.

The table in FIG. 7 teaches that the sample discs having the third semi-transparent reflective film 14a with the thickness in the range from 13 nm to 21 nm satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a with the thickness in the range from 13 nm to 21 nm when made from SiC—O, in the BD composite layer according to the present invention.

Discussed next with reference to FIG. 8 are the disc characteristics of several sample optical discs depending on the content of H in SiC—H, the material from which the third semi-transparent reflective film 14a was made. In the table of FIG. 8, the thicknesses of the second and third semi-transparent reflective films 13a and 14a were 9 nm and 15 nm, respectively, for all of the sample discs.

The table in FIG. 8 teaches that the sample discs having the third semi-transparent reflective film 14a made from SiC—H with the content of H in the range from 1 atomic % to 10 atomic % satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a made from SiC—H with the content of H in the range from 1 atomic % to 10 atomic % in the BD composite layer according to the present invention. More feasible range of H for the film 14a is 1 atomic % to 5 atomic % for higher disc characteristics.

Discussed next with reference to FIG. 9 are the disc characteristics of several sample optical discs depending on the thickness of the third semi-transparent reflective film 14a. In the table of FIG. 9, the third semi-transparent reflective film 14a was made from SiC—H (a mixture of SiC and H at 2 atomic %), with the second semi-transparent reflective film 13a of 9 nm in thickness, for all of the sample discs.

The table in FIG. 9 teaches that the sample discs having the third semi-transparent reflective film 14a with the thickness in the range from 13 nm to 21 nm satisfy the low reflectivity specifications for the single-layer BD, the reflectivity specifications for the dual-layer DVD, and also the jitter specifications for the single-layer BD.

It is thus preferable for the optical disc D to have the third semi-transparent reflective film 14a with the thickness in the range from 13 nm to 21 nm when made from SiC—H, in the BD composite layer according to the present invention.

As discussed above, the optical disc according to the present invention including the third semi-transparent reflective film 14a having the thickness in the range from 13 nm to 21 nm and made from a material having SiC as the primary component and N, O or H as the secondary component with the content of N, O or H in the material in the range from 1 atomic % to 10 atomic % satisfies the low reflectivity specifications for the single-layer BD, the reflectivity specifications for the dual-layer DVD, and also the jitter specifications for the single-layer BD.

The material having SiC as the primary component and N, O or H as the secondary component for the third semi-transparent reflective film 14a contributes to the improvements discussed above. This specific material serves to make smaller an optical attenuation coefficient of the reflective film 14a so that reflectivity of the film 14a is enhanced to the second laser beam L2 for reproduction from the third recording layers 14 (provided as adjacent to which is the film 14a) and also the first laser beam L1 for reproduction from the first and second recording layers 11 and 13. The optical attenuation coefficient indicates how much light is absorbed by a substance.

It is therefore preferable for the third semi-transparent reflective film 14a to be made from a material having SiC as the primary component and N, O or H as the secondary component with the content of N, O or H in the material in the range from 1 atomic % to 10 atomic %. A more feasible range for the secondary component is from 1 atomic % to 5 atomic %. In addition, a feasible range for the thickness of the reflective film 14a is from 13 nm to 21 nm.

Although data is not shown, other types of materials for the third semi-transparent reflective film 14a that satisfy the reflectivity and jitter specifications discussed above are: a material having SiC as the primary component and at least two elements among N, O and H as the secondary component with the content in the range from 1 atomic % to 10 atomic % in the material; and a material having Si as the primary component and at least one element among N, O and H as the secondary component with the content in the range from 1 atomic % to 10 atomic % in the material.

On the contrary, although data is not shown, Al or an alloy of Al and also Ag or an alloy of Ag for the third semi-transparent reflective film 14a with the thickness in the range from about 5 nm to 9 nm satisfy the reflectivity requirements in the BD-ROM specifications but not in the DVD-ROM specifications.

In reproduction of data from an optical disc, an optical disc recording/reproducing apparatus performs focus search to identify the type of the disc, with an objective lens driven to be closer to or apart from the optical disc so that each recording layer of the optical disc is set at a focal point of the objective lens. A focus search signal generated based on a light beam reflected from the optical disc includes focus-error signal components (S-shaped curves) indicating out of focus. The magnitude (peak-to-peak) of each S-shaped curve depends on reflectivity of the corresponding film in the optical disc, or the amount of light reflected from the film when the laser beam L hits the film in reproduction.

Figures 10, 11:
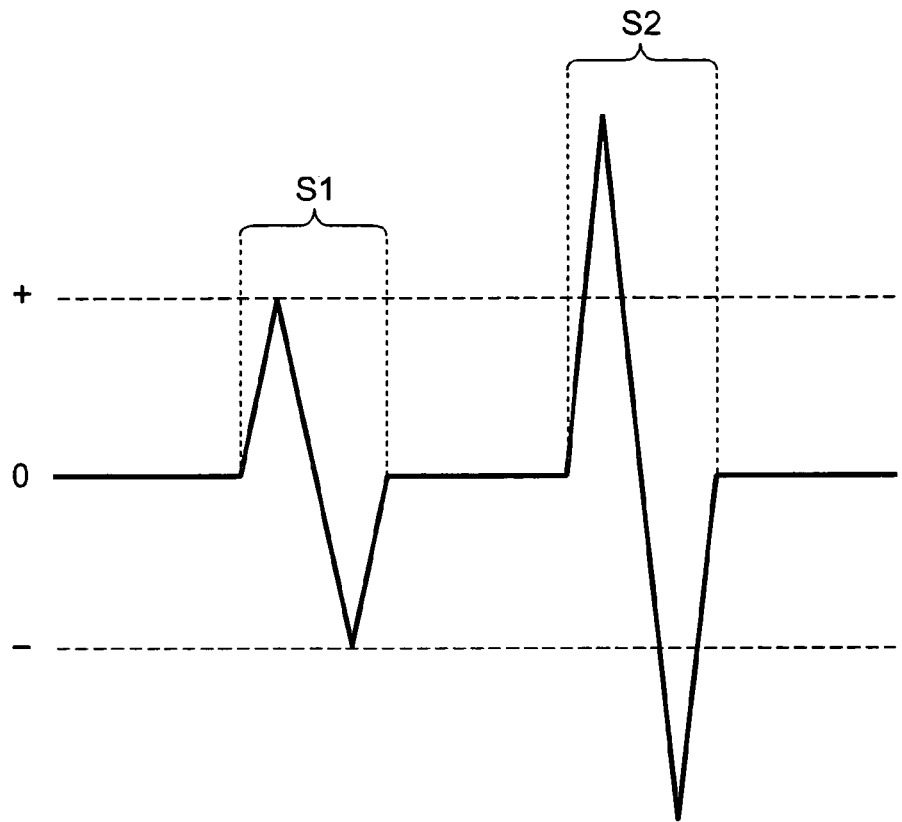
FIG. 10 illustrates a focus search signal generated from an optical disc (DVD) having only a single recording layer in compliance with the DVD specifications.
FIG. 11 is a view showing a table for use in evaluation of the disc characteristics depending on the material and the thickness of the third semi-transparent reflective film 14a in the optical disc according to the present invention.

Illustrated briefly in FIG. 10 is a focus search signal generated from an optical disc (DVD) having only a single recording layer in compliance with the DVD specifications. Shown in this figure are an S-shaped curve S1 generated from a disc light-incident surface via which a laser beam having a wavelength in compliance with the DVD specifications is incident in focus search and another S-shaped curve S2 generated from a reflective film formed on the single recording layer and provided between the disc light-incident surface and the recording layer.

As shown in FIG. 10, the magnitude (peak-to-peak) of the S-shaped curve S1 is smaller than that of the S-shaped curve S2, which indicates a lower reflectivity on the disc light-incident surface than the reflective film.

In other words, focus-error signal components (S-shaped curves) are defined as signal components generated based on difference in reflectivity between a disc light-incident surface and a reflective film formed on a recording layer and provided between the disc light-incident surface and the recording layer.

Focus servo is thus stably applied to a recording layer in DVD when focus-error signal components exhibit a larger magnitude on a reflective film formed on the recording layer than a disc light-incident surface, with such a positional relationship discussed above.

The optical disc D (the embodiment in the present invention) produced and evaluated as described so far could, however, suffer reproduction errors when subjected to focus search discussed above.

A problem could occur when focus search is performed to the first or the second recording layer 11 or 13, a DVD-recording layer in compliance with the DVD-ROM specifications, due to the existence of the BD composite layer, as shown in FIG. 1, between the transparent cover layer 17 (via which the laser beam L is incident in reproduction) and the DVD-recording layer.

In detail, when focus search is to be performed to the DVD-recording layer 11 or 13 at a wavelength of the first laser beam L1 for reproduction, focus servo could be erroneously applied to the BD-recording layer (third recording layer) 14, not to the target DVD-recording layer 11 or 13, depending on the amount of light reflected by the BD-reflective film (third semi-transparent reflective film) 14a, which could result in erroneous reproduction operation, or disc identification failure.

Therefore, it is speculated that the following are the requirements for the optical disc D (the embodiment in the present invention) to perform accurate focus search to the first or the second recording layer 11 or 13 (DVD-recording layer) with no erroneous focus servo to the third recording layer 14 (BD-recording layer), or vice versa, for normal reproduction from the recording layer 11, 13 or 14 in compliance with the DVD- or BD-ROM specifications.

The requirements are that the transparent cover layer 17 (via which the laser beam L is incident in reproduction), the third semi-transparent reflective film 14a, and the second semi-transparent reflective film 13a satisfy the relationship S13a>S17>S14a where S13a, S17 and S14a denote the magnitudes (peak-to-peak) of S-shaped curves (focus-error signal components) obtained from the reflective film 13a, the cover layer 17 and the reflective film 14a, respectively, at a wavelength of the first laser beam L1 for reproduction.

Discussed with respect to FIGS. 11 and 12 are the optimum materials and thickness, and also the reflectivity thereof for the third semi-transparent reflective film 14a in compliance with the BD-ROM specifications to satisfy the requirements mentioned above.

The materials and thickness for the second semi-transparent reflective film 13a that satisfy the above relationship will not be discussed below. This is because: FIG. 10 teaches that the reflective film 13a formed in compliance with the DVD specifications gives a larger magnitude to an S-shaped curve generated therefrom than the transparent cover layer 17 provided on the disc light-incident surface does; thus, the material and thickness used in FIGS. 4 to 8 for the reflective film 13a that gave a higher reflectivity to the DVD-L0 composite layer than the third semi-transparent reflective film 14a to the BD composite layer, and also gave GOOD in RESULTS in FIGS. 4 to 8 satisfy the above relationship.

Listed in the table of FIG. 11 are the disc characteristics of several sample optical discs depending on the material and thickness for the third semi-transparent reflective film 14a. Listed are: comparison between S14a and S17, the signal magnitudes (peak-to-peak) of S-shaped curves (focus-error signal components) obtained from the third semi-transparent reflective film 14a and the transparent cover layer 17, respectively, at a wavelength of the first laser beam L1 for reproduction; and results in reflectivity with respect to the low reflectivity specifications for the single-layer BD and the reflectivity specifications for the dual-layer DVD.

Several sample optical discs were produced according to the embodiment of the present invention, with variation in material and thickness for the third semi-transparent reflective film 14a. In detail, several reflective films 14a were formed with materials of Si, SiH (a mixture of Si and H at 2 atomic %), SiC—H (a mixture of SiC and H at 2 atomic %), Ag and Al, respectively, at the listed thicknesses. As already defined, the expression "H at 2 atomic %" in the above two cases means that 2 atomic % of H is involved in SiH or SiC—H.

In the reflectivity for the single-layer BD, a grade GOOD is given to the sample discs that exhibited reflectivities within the low reflectivity specifications ranging from 12% to 28%, discussed above, whereas a grade NG (No Good) to those out of the specifications.

In the reflectivity for the dual-layer DVD, a grade GOOD is given to the sample discs that exhibited reflectivities within the reflectivity specifications ranging from 18% to 30%, discussed above, whereas a grade NG (No Good) to those out of the specifications. The same is true in FIG. 12 which will be discussed later.

As shown in FIG. 11, the sample optical discs having the third semi-transparent reflective films 14a made from the listed materials at the listed thicknesses exhibited the following disc characteristics:

The material Si gave S17<S14a in signal magnitude, GOOD in reflectivity for single-layer BD but NG in reflectivity for dual-layer DVD, at the thickness of 24 nm. In contrast, the same material gave S17>S14a in signal magnitude, GOOD in reflectivity for dual-layer DVD but NG in reflectivity for single-layer BD, at the thickness of 12 nm.

Both of the materials SiH and SiC—H gave S17>S14a in signal magnitude, GOOD in reflectivity for single-layer BD and also dual-layer DVD, at the thicknesses of 13 nm and 15 nm, respectively.

Both of the materials Ag and Al gave S17<S14a in signal magnitude, GOOD in reflectivity for single-layer BD but NG in reflectivity for dual-layer DVD, at the thicknesses of 20 nm and 30 nm, respectively.

Accordingly, it is taught from FIG. 11 that an Si compound, such as SiH and SiC—H, gives S17>S14a, or a lower reflectivity to the third semi-transparent reflective film 14a than the transparent cover layer 17, when used for the film 14a, thus allowing highly accurate reproduction from the DVD- and BD-recording layers.

Listed in the table of FIG. 12 are the disc characteristics of several sample optical discs depending on the material (Si only or Si compound) and thickness for the third semi-transparent reflective film 14a. Listed are: data on reflectivity of the film 14a at a wavelength of the second laser beam L2 for reproduction; comparison between S14a and S17, the signal magnitudes (peak-to-peak) of S-shaped curves obtained from the third semi-transparent reflective film 14a and the transparent cover layer 17, respectively, at a wavelength of the first laser beam L1 for reproduction; and results in reflectivity with respect to the reflectivity specifications for the dual-layer DVD; and results of reproduction from the DVD-recording layer (11, 13) with grades STABLE and UNSTABLE given for complete reproduction and incomplete reproduction, respectively.

As shown in FIG. 12, the sample optical discs having the third semi-transparent reflective films 14a made from the listed materials at the listed thicknesses exhibited the following disc characteristics:

The material Si gave 12% in reflectivity to laser L2, S17<S14a in signal magnitude, NG in reflectivity for dual-layer DVD, and UNSTABLE in reproduction from the DVD-recording layer, at the thickness of 16 nm. In contrast, the same material gave 10% in reflectivity to laser L2, S17>S14a in signal magnitude, GOOD in reflectivity for dual-layer DVD, and STABLE in reproduction from the DVD-recording layer, at the thickness of 12 nm. Nevertheless, the reflectivity of 10% to laser L2 does not satisfy the low reflectivity specifications for the single-layer BD, thus causing unstable reproduction from the BD-recording layer.

The material SiH (a mixture of Si and H at 2 atomic %) gave 12% in reflectivity to laser L2, S17>S14a in signal magnitude, GOOD in reflectivity for dual-layer DVD, and STABLE in reproduction from the DVD-recording layer, at the thickness of 13 nm. Also, at the thickness of 17 nm, the material SiH (a mixture of Si and H at 2 atomic %) gave 19% in reflectivity to laser L2, S17>S14a in signal magnitude, GOOD in reflectivity for dual-layer DVD, and STABLE in reproduction from the DVD-recording layer.

On the contrary, the material SiH (a mixture of Si and H at 6 atomic %) gave 20% in reflectivity to laser L2, S17<S14a in signal magnitude, GOOD in reflectivity for dual-layer DVD, but LESS STABLE in reproduction from the DVD-recording layer, at the thickness of 18 nm. Likewise, the material SiH (a mixture of Si and H at 8 atomic %) gave 23% in reflectivity to laser L2, S17<S14a in signal magnitude, GOOD in reflectivity for dual-layer DVD, but LESS STABLE in reproduction from the DVD-recording layer, at the thickness of 20 nm.

The material SiC—H (a mixture SiC and H at 2 atomic %) gave 12% in reflectivity to laser L2, S17>S14a in signal magnitude, GOOD in reflectivity for dual-layer DVD, and STABLE in reproduction from the DVD-recording layer, at the thickness of 14 nm. Also, at the thickness of 18 nm, the material SiH (a mixture of Si and H at 2 atomic %) gave 19% in reflectivity to laser L2, S17>S14a in signal magnitude, GOOD in reflectivity for dual-layer DVD, and STABLE in reproduction from the DVD-recording layer.

On the contrary, the material SiC—H (a mixture of SiC and H at 6 atomic %) gave 20% in reflectivity to laser L2, S17<S14a in signal magnitude, GOOD in reflectivity for dual-layer DVD, but LESS STABLE in reproduction from the DVD-recording layer, at the thickness of 19 nm. Likewise, the material SiC—H (a mixture of SiC and H at 8 atomic %) gave 23% in reflectivity to laser L2, S17<S14a in signal magnitude, GOOD in reflectivity for dual-layer DVD, but LESS STABLE in reproduction from the DVD-recording layer, at the thickness of 21 nm.

The table in FIG. 12 teaches the following: The sample third semi-transparent reflective films 14a including an Si compound, such as, SiC—H and SiH, and exhibiting reflectivity in the range from 12% to 19% satisfied the relationship S17>S14a, the low reflectivity specifications for the single-layer BD and the reflectivity specifications for the dual-layer DVD, and offered stable reproduction from the BD- and DVD-recording layers. The sample third semi-transparent reflective film 14a including an Si compound and exhibiting reflectivity over 19% did not satisfy the relationship S17>S14a, thus causing less stable reproduction from the DVD-recording layers. Nevertheless, the sample films 14a that exhibited reflectivity over 19% fell in the range from 1 atomic % to 10 atomic % for H involved in the film material and the range from 13 nm to 21 nm for their thicknesses and thus satisfied the low reflectivity specifications for the single-layer BD and the reflectivity specifications for the dual-layer DVD, as discussed above.

In addition to the materials listed in table of FIG. 12 for the third semi-transparent reflective films 14a, others, such as, SiC or Si as the primary component with N or O as the secondary component, or SiC or Si as the primary component with at least two elements from N, O and H as the secondary component, offer stable reproduction from the BD- and DVD-recording layers.

As discussed above, the requirements for the third semi-transparent reflective films 14a in the optical disc D according to the present invention that satisfy the low reflectivity specifications for the single-layer BD and the reflectivity specifications for the dual-layer DVD and offer stable reproduction from the BD- and DVD-recording layers are as follows:

Material: a mixture of an Si compound of SiC or Si as the primary component and at least one element from N, O and H as the secondary component at 1 atomic % to 10 atomic % in content in the mixture;

Film thickness: 13 nm to 21 nm; and

Reflectivity: 12% to 19%

In the embodiment disclosed above, the first, the second and the third recording layers 11, 13 and 14 are read-only type recording layers. Not only such type, however, these recording layers can be a write-once type made of a material with dye or a rewrite type made of a phase-change material, in the scope of the present invention.

Moreover, in the embodiment disclosed above, the first and second recording layers 11 and 13 are formed in compliance with the DVD-ROM specifications whereas the third recording layer 14, the BD-ROM specifications. The present invention is, however, not bounded to such specifications.

As disclosed above in detail, the present invention provides the optical disc that meets both of first and second different specifications on reflectivity, reproducible with image quality in the two specifications.

Thus, for example, when the first and second different specifications are the DVD-ROM and BD-ROM specifications, respectively, there is no need to produce two types of optical discs in compliance with the DVD- and BD-ROM specifications for the same video contents in the present invention. Therefore, the present invention contributes resource and energy saving and boosts convenience for disc users.

What is claimed is:

1. An optical disc comprising:
   a first substrate having a first surface, the first surface having a first recording layer formed thereon, the first recording layer being capable of storing first data in compliance with first specifications;
   a first reflective film formed on the first recording layer;
   a second substrate having a second surface and a third surface on both sides, the second surface having a second recording layer formed thereon, the second recording layer being capable of storing second data in compliance with the first specifications, the third surface having a third recording layer formed thereon, the third recording layer being capable of storing third data in compliance with second specifications different from the first specifications;
   a second semi-transparent reflective film formed on the second recording layer, the second semi-transparent reflective film having a thickness in the range from 5 nm to 15 nm;
   a third semi-transparent reflective film formed on the third recording layer;
   an adhesive layer provided between the first and second reflective films; and
   a transparent cover layer, having a thickness of 100 µm±3 µm, with a fourth surface and a fifth surface on both sides, the transparent layer being formed on the third semi-transparent reflective film at the fourth surface, the fifth surface allowing a laser beam to pass therethrough in reproduction of the first, the second or the third data from the first, the second, or the third recording layer, respectively.

2. The optical disc according to claim 1, wherein the third semi-transparent reflective film has a thickness in the range from 13 nm to 21 nm and is made from a material including SiC as a primary component and at least one element among nitrogen, oxygen and hydrogen as a secondary component, the secondary component being involved in the material in the range from 1 atomic % to 10 atomic % in content.

3. The optical disc according to claim 1, wherein the third semi-transparent reflective film exhibits a lower reflectivity than the transparent cover layer to a laser beam having a wavelength in the first specifications.

4. A method of producing an optical disc comprising the steps of:
   forming a first recording layer on a first surface of a first substrate, the first recording layer being capable of storing first data in compliance with first specifications;
   forming a first reflective film formed on the first recording layer;
   forming a second recording layer and a third recording layer on a second surface and a third surface, respectively, of a second substrate on both sides, the second recording layer being capable of storing second data in compliance with the first specifications, the third recording layer being capable of storing third data in compliance with second specifications different from the first specifications;
   forming a second semi-transparent reflective film on the second recording layer, the second semi-transparent reflective film having a thickness in the range from 5 nm to 15 nm;
   forming a third semi-transparent reflective film on the third recording layer;
   bonding the first and second reflective films via an adhesive layer provided therebetween; and
   forming a transparent cover laye, having a thickness of 100 µm±3 µm on the third semi-transparent reflective film.

5. The method according to claim 4, wherein the third semi-transparent reflective film is formed so as to have a thickness in the range from 13 nm to 21 nm and made from a material including SiC as a primary component and at least one element among nitrogen, oxygen and hydrogen as a secondary component, the secondary component being involved in the material in the range from 1 atomic % to 10 atomic % in content.

6. The method according to claim 4, wherein the third semi-transparent reflective film is formed so as to exhibit a lower reflectivity than the transparent cover layer to a laser beam having a wavelength in the first specifications.

* * * * *